Feb. 17, 1942.　　　I. B. LAWYER　　　2,273,713
PLASTIC INJECTION MOLDING MACHINE
Filed Oct. 6, 1938　　　2 Sheets-Sheet 1
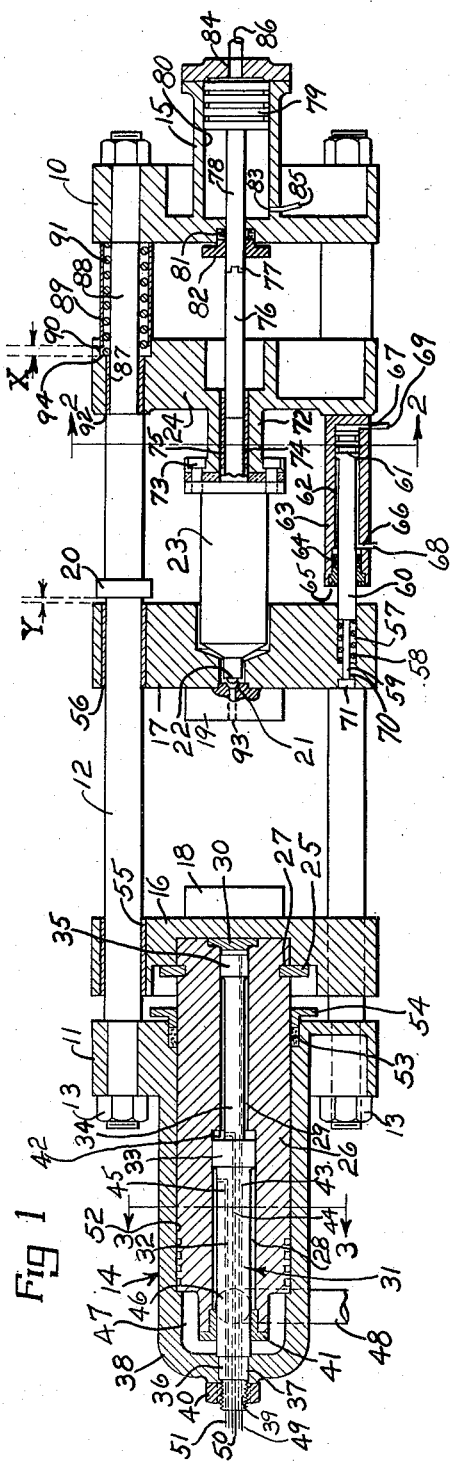
INVENTOR
IRA B. LAWYER
By Toulmin & Toulmin
ATTORNEYS Feb. 17, 1942.  I. B. LAWYER  2,273,713
PLASTIC INJECTION MOLDING MACHINE
Filed Oct. 6, 1938  2 Sheets-Sheet 2

INVENTOR
IRA B. LAWYER
BY Toulmin & Toulmin
ATTORNEYS

Patented Feb. 17, 1942

2,273,713

UNITED STATES PATENT OFFICE 2,273,713

PLASTIC INJECTION MOLDING MACHINE

Ira B. Lawyer, Mount Gilead, Ohio, assignor to The Hydraulic Development Corp. Inc., Wilmington, Del., a corporation of Delaware Application October 6, 1938, Serial No. 233,630

10 Claims. (Cl. 18—30)

This invention relates to molding machines, and in particular, to plastic injection molding machines for the molding of articles from plastic materials.

One object of this invention is to provide a plastic injection molding machine, wherein the injection nozzle is urged into engagement with the mold by means of spring pressure, or similar yielding force, thereby preventing damage to the nozzle by reason of the high clamping pressures frequently used in clamping the mold halves together.

Another object is to provide a plastic injection molding machine of the above type, wherein the mold half having the nozzle socket is brought to a halt by means of a stop so that this stop resists the thrust of the clamping plunger and relieves the nozzle from the necessity of sustaining this excessively high thrust.

Another object is to provide a plastic injection molding machine, wherein the mold assembly engaged by the injection nozzle compresses a spring device before encountering the stop means which halts the travel of this mold assembly, this spring device serving to separate the mold assembly from the injection nozzle when the mold clamping pressure has been removed and the molds separated, thereby breaking off the "sprue" and likewise preventing the subsequent transmission of heat from the heated injection chamber, through the nozzle, to the mold.

Another object is to provide a plastic injection molding machine according to the preceding paragraph, wherein additional means is provided for moving the mold a still greater distance away from the nozzle to facilitate cleaning, or to enable the removal of the nozzle or of plastic material adhering to the nozzle without serious loss of time.

Another object is to provide a plastic injection molding machine, wherein the mold carrier for the mold half having the nozzle socket and the injection chamber with its nozzle, are supported upon yielding devices, such as springs, whereby the injection nozzle is automatically positioned in its mold socket.

Another object is to provide a plastic injection molding machine, wherein the mold halves are clamped together by hydraulic pressure, a forcibly opened check valve being provided for facilitating the discharge of fluid from the clamping cylinder during the retraction stroke thereof.

Another object is to provide a plastic injection molding machine, wherein the mold halves are closed and clamped by a hydraulic motor, including a hollow clamping ram and a stationary booster piston combined with a stationary pullback piston operating in chambers within the hollow clamping ram.

In the drawings:

Figure 1 is a horizontal section through a plastic injection molding machine according to the present invention, taken along the broken line 1—1 in Figure 2.

Figure 2 is a cross section along the line 2—2 in Figure 1.

Figure 3 is a cross section through the hydraulic clamping motor, taken along the line 3—3 in Figure 1.

*General arrangement*

Figure 4:
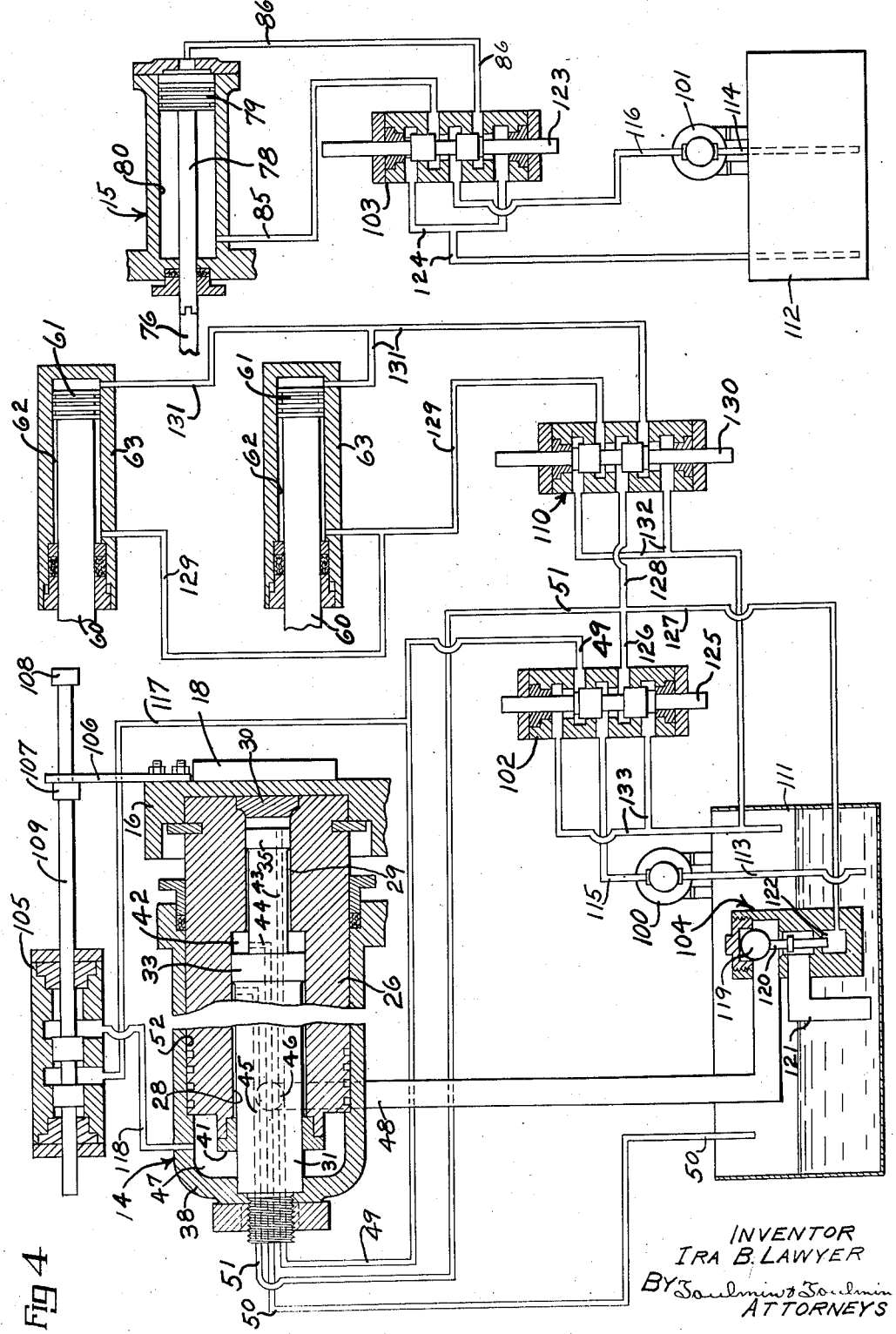
Figure 4 is a diagrammatic view of a working circuit, including the principal elements of the plastic injection molding machine shown in Figure 1.

In general, the plastic injection molding machine of this invention includes a pair of mold carriers, both movable along a frame and each carrying a portion of the mold, usually a pair of mold halves which when closed cooperate to form a mold. One of the mold carriers is moved into engagement with the other carrier by means of a hydraulic motor, whereas the other mold carrier is urged by springs away from a nozzle. This nozzle communicates with a heated injection chamber, which is also supported upon springs tending to urge the nozzle into engagement with the nozzle socket in one of the mold halves. The mold carrier upon which the last-mentioned mold half is supported, comes to rest against fixed stops on the frame when the hydraulic motor has closed the mold halves and urged one of them into engagement with the nozzle of the injection chamber. In this manner the nozzle is urged into the nozzle socket of the mold with a predetermined pressure, yet is prevented from being exposed to the entire mold-clamping pressure by the presence of the stops which halt the travel of one of the mold carriers.

The mold-clamping motor is provided with a pump circuit for supplying pressure fluid thereto, the circuit including a check valve having means associated therewith for forcibly opening the check valve upon the retraction stroke of the clamping motor, thereby permitting the direct discharge of the fluid from the clamping motor during the retraction stroke. At the same time, this check valve enables fluid to be drawn into the main cylinder of the mold-clamping motor while the booster cylinder thereof is operating to rapidly close the molds. When the molds are closed the consequent building up of pressure within the main cylinder closes the check valve and enables the mold-clamping pressure to be subsequently built up to the required amount.

The mold carrier adjacent the injection nozzle is engaged by plungers having springs on the ends thereof, whereby the nozzle socket of the mold is urged out of engagement with the nozzle when the mold halves are opened. This feature of separating the mold socket from the injection nozzle breaks off the thread of molding material which would otherwise connect the molded article with the injection nozzle, and also prevents the transfer of heat from the nozzle to the mold while the mold halves are open. The plungers carrying the above-mentioned springs are themselves reciprocable in cylinders, whereby the mold carrier may be moved a considerable distance away from the injection nozzle in order to clean the nozzle or the mold, or to remove the pieces of solidified molding material which occasionally clog in the nozzle socket or channel leading to the mold cavity.

Hitherto, the use of an injection nozzle directly in engagement with the mold frequently caused serious damage to the injection nozzle because of the tremendous pressure required for clamping the mold sections together in order to prevent the escape of molding material during the injection operation. When the mold and nozzle were mounted in fixed relationship to each other and the attempt was made thereby to reduce the load applied to the nozzle, it was necessary to readjust the position of the nozzle when molds were changed so that the nozzle would be so positioned that it engaged the mold with greater pressure. When this adjustment was incorrectly made a loss of time, and frequently serious damage to the mold or nozzle resulted. Furthermore, the previous use of a mold in fixed engagement with the injection nozzle prevented the separation of the mold from the nozzle in order to break the sprue or thread of solidified plastic material that extends from the nozzle to the molded piece. This same use of a nozzle in engagement with the mold also caused heat to be continuously transferred from the nozzle to the mold, thereby heating the mold and retarding the cooling and solidification of the molded article and cutting down the rate of production of molded articles.

Another disadvantage of this fixed relationship between the mold and the injection nozzle resided in the difficulty of cleaning the mold channel and nozzle when the sprue was not pulled out with the molded piece, but instead remained in the mold channel. In this event it was necessary to remove the sprue before another injection could be made, and this removal had to be done quickly or the molding material in the nozzle would be overheated. Furthermore, material oozing out of the nozzle must be removed occasionally and without serious loss of time, but in previous constructions wherein the nozzle was in fixed engagement with the mold, this cleaning operation was difficult. These disadvantages are overcome in the construction according to the present invention.

General construction

The plastic injection molding machine of this invention, in the embodiment shown in Figures 1 to 3, consists of a pair of heads 10 and 11 interconnected by strain rods 12, and maintained in connection by the nuts 13 threaded upon the ends of the strain rods. The head 11 carries the clamping motor, generally designated 14, whereas the head 10 carries the injection motor 15. Slidably mounted along the strain rods 12 are the mold carriers 16 and 17, upon which are mounted the mold halves 18 and 19 (Figure 1). The mold carrier 16 is moved to and fro by the clamping motor 14 to open and close the mold halves 18 and 19, in a manner described below. When the mold halves 18 and 19 are closed the mold carrier 17 is urged into engagement with the stop collars 20 upon the strain rods 12, the latter thereafter sustaining the thrust of the clamping motor 14.

At the same time the mold carrier 17 and the nozzle socket 21 of its mold half 19 are brought into engagement with the nozzle 22, connected to the heating and injection chamber 23. The latter is supported upon a crosshead 24, which is likewise slidably mounted upon the strain rods 12 and yieldingly supported, as described below. Mounted on the crosshead 24 is a hopper or container for molding material together with a feeding device (not shown). This hopper and feeding device form no part of the present invention, and such devices are known to those skilled in the art.

Clamping motor construction

The mold carrier 16 is secured by a split ring 25 to the outer end of the clamping plunger 26, this split ring 25 engaging an annular groove 27 therein. Within the clamping plunger 26 are coaxial bores 28 and 29 of different diameters, the bore 29 terminating in a head 30. Reciprocable within the bores 28 and 29 is a booster and pull-back plunger, generally designated 31. The latter consists of a pull-back portion 32 having a piston head 33 within the bore 28 and a booster portion 34 having a piston head 35 within the bore 29. The booster and pull-back plunger 31 is stationary and is provided with a reduced diameter portion 36 mounted in the aperture 37 in the end of the clamping cylinder 38, forming a portion of the clamping motor 14, the end of the plunger 31 being threaded, as at 39, to receive a retaining nut 40 for holding the assembly in position. An annular head 41 surrounds the pull-back portion 32 to close one end of the bore 28, the opposite end of which is provided with an annular shoulder 42 between the bores 28 and 29.

The booster and pull-back plunger 31 is provided with a drilled passageway 43 communicating with the right-hand end of the bore 29 beyond the piston head 35, and is similarly provided with drilled passageways 44 and 45 communicating with the bore 28 on opposite sides of the piston head 33. A port 46 opens into the outer end of the bore 47 of the cylinder 38, and is connected to a conduit 48. Similarly, the drilled passages 43, 44 and 45 are connected, respectively, to conduits 49, 50 and 51. The bore 47 continues to the right in the bore 52, within which the clamping plunger 26 is reciprocable, and a packing 53 and gland 54 prevent leakage. The mold carrier 16 is provided with bearing sleeves 55 for facilitating the sliding engagement thereof with the strain rods 12.

Injection assembly

The mold carrier 17 is provided with bearing sleeves 56, similar to the bearing sleeves 55 and similarly serving to facilitate sliding engagement along the strain rods 12. The mold carrier 17 is likewise provided with bores 57 having springs 58 therein surrounding the reduced diameter portions 59 of piston rods 60, the latter having piston heads 61 reciprocable within the bores 62 of cylinders 63. Packings 64 and glands 65 prevent leakage therefrom. The opposite ends of the cylinders 63 are provided with ports 66 and 67, to which the conduits 68 and 69 are connected. The reduced diameter portions 59 pass through corresponding bores 70 in the mold carrier 17 and carrier retaining nuts 71 threaded upon the outer ends thereof.

The cylinders 63 are mounted upon the crosshead 24, which also has a cylindrical extension 72 to which the heating and injection chamber 23 is secured, as by the bolts 73. The cylindrical extension 72 is provided with a bore 74 and aligning sleeve 75, within which an injection plunger 76 reciprocates. The latter is connected, as at 77, to the piston rod 78 having the piston 79 mounted within the cylinder bore 80 of the injection motor 15. As before, a packing 81 and gland 82 prevent leakage around the piston rod 78. Ports 83 and 84 open into the opposite ends of the cylinder bore 80, and to them are connected the conduits 85 and 86, respectively.

The crosshead 24 carries bearing sleeves 87 for facilitating its reciprocation along the reduced diameter portions 88 of the strain rods 12, this reciprocation being limited in one direction by the spring housing sleeves 89 abutting the head 10 at their right-hand ends, and having their left-hand ends 90 serving as stops for limiting the reciprocation of the crosshead 24 to the right. Springs 91 surround the reduced diameter strain rod portions 88, and continually urge the crosshead 24 toward the annular shoulders 92 between the main portions of the strain rods 12 and their reduced diameter portions 88. The springs 91 also urge the heating and injection chamber 23 and its nozzle 22 toward the nozzle socket 21, the latter communicating with the mold channel 93 in the mold half 19. The distance X between the annular shoulder 94 and the end 90 of the spring housing sleeve 91, through which the crosshead 24 may move, is greater than the distance Y between the adjacent surfaces of the crosshead 24 and stop collars 20, the latter being the distance that the mold carier 17 may move in normal operation.

Hydraulic circuit

Figure 4 shows a hydraulic circuit suitable for operating the plastic injection molding machine of this invention, but other circuits may also be employed. In the circuit of Figure 4 there is provided pumps 100 and 101 for supplying pressure fluid to advance and retract the clamping plunger 26 and injection piston 79, respectively, as controlled by the four-way clamping control valve 102 and the four-way injection control valve 103, respectively. A forcibly opened check valve 104 is controlled as to its forcible opening by a normally closed two-way valve 105, operated by the mold carrier arm 106 secured to the mold carrier 16 and adapted to engage stop collars 107 and 108 on the valve rod 109. The four-way mold-shifting valve 110, similar to the valves 102 and 103, controls the supply of pressure fluid to the cylinders 63 so as to separate the mold carrier 17 and mold half 19 from a position in proximity to the heating and injection chamber 23, thereby enabling the nozzle 22 to be exposed for cleaning or repairs, and also enabling the mold channel 93 to be cleaned out if clogged by the sprue.

Operation

In the operation of the plastic injection molding machine of this invention, the pumps 100 and 101 are started in operation and thereby caused to withdraw fluid from the reservoirs 111 and 112, through the suction lines 113 and 114, and to discharge pressure fluid through the pressure lines 115 and 116 leading to the four-way valves 102 and 103, respectively. To advance the clamping plunger 26 and close the mold halves 18 and 19, the operator shifts the four-way clamping control valve 102, thereby admitting pressure fluid from the line 115, to the line 49, this pressure fluid entering the right-hand end of the bore 29 within the clamping plunger 26. This pressure fluid acts against the head 30, and since the head 35 is stationary, the clamping plunger 26 is advanced rapidly, bringing the mold halves 18 and 19 together.

The fluid required to fill the space in the cylinder bores 47 and 52 is supplied through the line 48 and the check valve 104 within the reservoir 111, the ball 119 rising naturally in response to the suction within the line 48 caused by the reciprocation of the clamping plunger 26 to the right. The check valve plunger 120 rises with the ball 119 and fluid is permitted to pass through the valve from the suction line 121. No pressure exists at this time within the plunger-lifting chamber 122, hence, the check valve 119 and plunger 120 are free to drop and close the check valve 104 as soon as the clamping plunger 26 halts and pressure builds up within the cylinder bores 47 and 52 of the clamping cylinder 38.

When the mold halves 18 and 19 are brought together the mold carrier arm 106 engages the collar 108 upon the valve rod 109, and shifts the two-way valve 105. Pressure fluid then passes from the line 49 by way of the branch line 117, the two-way valve 105 and the line 118, into the cylinder bore 47, building up pressure against the end of the clamping plunger 26, the check valve 104 meanwhile closing when the suction in the line 49 has terminated. The clamping plunger 26 then continues to advance, causing the mold carrier 16 and mold half 18 to push the mold half 19 and mold carrier 17 to the right (Figure 1), compressing the springs 58 and causing the nozzle socket 21 of the mold half 19 to engage the nozzle 22 of the heating and injection chamber 23. The mold carrier 17 is then halted by its engagement with the stop collars 20, after having been shifted through the distance Y, previously mentioned. Meanwhile, the springs 91 yield so as to enable the nozzle 22 to center itself in the nozzle socket 21, the compression of the springs 91 insuring that the correct contact pressure exists between the mold half 19 and the nozzle 22. The stop collars 20 upon the strain rods 12 prevent the mold carrier 17 from being moved any farther by the clamping plunger 26 and mold carrier 16, hence, the full clamping pressure is now exerted against the mold halves 18 and 19 to hold them together with the tremendous force necessary to counteract the force exerted by the injected material during the injection operation.

During this time the plastic molding material has been fed to the heating and injection chamber 23 and reduced to a plastic condition.

To inject this material (Figure 4) the operator now moves the valve rod 123 of the four-way injection control valve 103 downwardly, permitting pressure fluid to pass from the line 106, into the line 86, and thence into the right-hand end of the cylinder bore 80, pushing the piston 79, piston rod 78 and injection plunger 76 to the left, injecting the charge of plastic material from the heating and injection chamber 23, through the nozzle 22, into the mold channel 93, and thence into the mold cavity. The injection piston 79 and injection plunger 76 are now retracted by shifting the valve rod 123 upward so as to admit pressure fluid from the line 116 to the line 85, leading to the left-hand end of the cylinder bore 80. During either of these operations the fluid discharged from the end of the cylinder bore 80 not under pressure is exhausted through the discharge line 124 leading from the four-way valve 103 to the reservoir 111.

To retract the clamping plunger 26 and open the mold halves 18 and 19 after the molded article has cooled sufficiently, the operator shifts the valve rod 125 of the clamping control valve 102 upward, permitting pressure fluid to pass from the pump pressure line 115 to the line 126, and thence through the line 51 and the passageway 45 in the booster and pull-back plunger 31, into the bore 28 within the clamping plunger 26 to the left of the head 33. This pressure acts against the head 41 and moves the clamping plunger 26 rapidly to the left, retracting the clamping plunger 26 and separating the mold halves 18 and 19. At the same time that pressure fluid was admitted from the line 126 to the line 51, it also passed through the line 127, into the plunger-lifting chamber 122 of the check valve 104, causing the plunger 120 to lift the valve ball 119 and forcibly open the check valve 104. This permits the fluid in the bore 47 of the clamping cylinder 38 to be exhausted through the port 46, line 48, check valve 104 and line 121 as the clamping plunger 26 is retracted to the left.

The fluid displaced from the right-hand end of the cylinder bore 28 immediately adjacent the annular piston area 42 within the clamping plunger 26, is discharged through the drilled passageway 44 and the line 50, into the reservoir 111, whereas the fluid similarly displaced from the chamber adjacent the head 30 and to the right of the head 35, is discharged through the drilled passageway 43, the line 49, the four-way valve 102 and the line 133, into the reservoir 111. Meanwhile, the operator has shifted the valve rod 130 upward so that pressure fluid is supplied through the lines 126 and 128 and through the four-way valve 110 and the line 129 to the left-hand end of the cylinder bores 62, urging the piston heads 61 and the piston rods 60 to the right into the positions shown in Figures 1 and 4. The fluid displaced from the right-hand ends of the cylinder bores 62 is discharged through the line 131, the four-way valve 110 and the discharge line 132, into the reservoir 111.

Thus, while the mold halves 18 and 19 are being separated by the retraction of the clamping plunger 26, the pistons 61 and piston rod 60, are held firmly in their extreme right-hand positions, shown in Figures 1 and 4, so that the springs 58 within the bores 57 of the mold carrier 17 push the latter a short distance away from the nozzle 22, thereby breaking off the sprue and subsequently preventing the transfer of heat to the mold half 19 from the heating and injection chamber 23 by way of the nozzle 22. The nuts 71 on the ends of the reduced diameter portions 59 of the piston rod 60 prevent the mold carrier 17 from being dragged along by the mold half 18, due to the force required to separate the mold halves 18 and 19 from the tendency of the molded piece to stick to both mold halves and hold them together.

When the clamping plunger 26 has reached its fully retracted position, shown in Figures 1 and 4, one molding cycle has been completed. The retraction of the clamping plunger 26 and the mold carrier 16 causes the mold carrier arm 106 to engage the stop collar 107 and shift the valve rod 109 of the two-way valve 105 to the left. This closes the connection between the lines 117 and 118 and prevents the discharge of pressure fluid from the pump 115, into the clamping cylinder bore 47, until the booster action causes the mold carrier arm 106 again to engage the stop collar 108 and open the two-way valve 105. By this arrangement the entire output of the pump 100 is delivered to the booster cylinder bore 29 during the rapid traverse of the clamping plunger 29 and mold carrier 16 during the initial part of their strokes. No part of the discharge of the pump 100 is diverted into the cylinder bore 47 because the two-way valve 105 is closed at this stage of the cycle and the fluid required to fill up the clamping cylinder bore 47 is supplied thereto through the lines 48 and 121 by way of the check valve 104.

Occasionally it is necessary to move the mold carrier 17 a considerable distance to the left in order to expose the nozzle 22. This occurs when the sprue sticks in the mold channel 93 and breaks off from the molded article instead of being pulled out with the molded article. This sprue must be removed before another injection can be made and its removal must be performed quickly or the material in the heating and injection chamber 23 and nozzle 22 will become overheated. Furthermore, material often oozes out of the nozzle 22 and must be removed occasionally and without serious loss of time. The pistons 61 and piston rods 60 provide means for quickly moving the mold carrier 17 away from the nozzle 22 a greater distance than that accomplished by the springs 58, and also for returning the mold carrier 17 to its operating position, shown in Figure 1.

To perform this cleaning operation the operator shifts the valve rod 130 of the four-way valve 110 downwardly. This is done when the valve rod 125 of the clamping control valve 102 is shifted upward as for a retraction stroke of the clamping plunger 26 (Figure 4). When this occurs pressure fluid passes from the pump 100, through the line 115, the four-way valve 102, the lines 126 and 128, the four-way valve 110 and the line 131, into the right-hand end of the cylinder bore 62, shifting the pistons 61, piston rods 60 and mold carrier 17 to the left and exposing the nozzle 22 and mold nozzle socket 21 for cleaning or repairs.

To return the mold carrier 17 to its operating position, shown in Figure 1, the operator shifts the valve rod 130 of the four-way valve 110 downward so that pressure fluid is admitted from the lines 126 and 128 to the line 129, into the left-hand ends of the cylinder bores 62, pushing the pistons 61, piston rods 60 and mold carrier 17 to the right, back into the working position of the latter. If the operator forgets to reverse the valve 110 after the cleaning operation, no harm will result because pressure fluid reaches the four-way valve 110 only during the retraction stroke of the clamping plunger 26, and because the lines 126 and 128 are open to discharge into the reservoir 111, through the line 133, when the clamping plunger 26 is on its forward stroke. In other words, the operator must reverse the clamping control valve 102 from its forward stroke to its retraction stroke before he can separate the mold carrier 17 and mold half 19 from the nozzle 22 and heating and injection chamber 23 by means of the pistons 61.

It will be understood that I desire to comprehend within my invention such modifications as come within the scope of the claims and the invention.

Having thus fully described my invention, what I claim as new and desire to secure by Letters Patent, is:

1. In a plastic injection molding machine, an injector with a nozzle for supplying plastic material to said machine, a sectional mold arranged to receive molding material from said nozzle, fluid pressure means for closing and holding the mold sections together, spring means for yieldingly supporting said injector nozzle in engagement with one of said mold sections and against the thrust of the other section, and a fixed stop positioned to arrest the motion of one of the said mold sections after the closing of said mold sections following the compression of said spring means by said mold-closing motion to limit the degree of compression of the yielding injector supporting means.

2. In a plastic injection molding machine, an injector with a nozzle for supplying plastic material to said machine, a sectional mold arranged to receive molding material from said nozzle, fluid pressure means for closing and holding the mold sections together, spring means for yieldingly supporting one of said mold sections against the thrust of the other section, a fixed stop positioned to arrest the motion of one of said mold sections after the closing of said mold sections following the compression of said spring means by said mold-closing motion, and additional spring means for holding said nozzle in engagement with one of said mold sections.

3. In a plastic injection molding machine, an injector with a nozzle for supplying plastic material to said machine, a sectional mold arranged to receive molding material from said nozzle, fluid pressure means for bringing and holding the mold sections together, spring means for yieldingly supporting one of said mold sections against the thrust of the other section, means to absorb said thrust without completely compressing said yielding means, said yielding means causing engagement of said nozzle with said mold, and a motor for forcibly separating said nozzle from the mold section engaged thereby.

4. In a plastic injection molding machine, an injector with a nozzle for supplying plastic material to said machine, a sectional mold arranged to receive molding material from said nozzle, fluid pressure means for bringing and holding the mold sections together, spring means for yieldingly supporting one of said mold sections against the thrust of the other section, means to absorb said thrust without completely compressing said yielding means, said yielding means causing engagement of said nozzle with said mold, and a fluid pressure ram for forcibly separating said nozzle from the mold section engaged thereby.

5. In a plastic injection molding machine, a frame, a sectional mold, a mold carrier for each mold section movable relatively to said frame, an injector with an injector nozzle movable into engagement with one of said mold sections, a fluid pressure motor for bringing and holding the mold sections together and in engagement with said nozzle, yielding means for supporting said nozzle against the thrust of said mold sections, and a second fluid pressure motor connected to one of said mold sections for moving said mold section away from said nozzle.

6. In a plastic injection molding machine, a frame, a sectional mold, a mold carrier for each mold section movable relatively to said frame, an injector with an injector nozzle movable into engagement with one of said mold sections, a fluid pressure motor for bringing and holding the mold sections together and in engagement with said nozzle, yielding means for supporting said nozzle against the thrust of said mold sections, a second fluid pressure motor connected to one of said mold sections for moving said mold section away from said nozzle, and yielding means forming a part of the connection between said mold section and said second fluid pressure motor.

7. In a plastic injection molding machine, a frame, a sectional mold, a mold carrier for each mold section movable relatively to said frame, an injector with an injector nozzle movable into engagement with one of said mold sections, a fluid pressure motor for bringing and holding the mold sections together and in engagement with said nozzle, yielding means for supporting said nozzle against the thrust of said mold sections, a second fluid pressure motor connected to one of said mold sections for moving said mold section away from said nozzle, and a spring device yieldingly disposed between said second fluid pressure motor and the mold section connected thereto for providing a floating connection therebetween.

8. In a plastic injection molding machine, a pair of separable molds, means for moving one mold into engagement with the other mold and applying clamping pressure thereon, an injector with an injection nozzle, means for yieldingly supporting said injection nozzle, said mold closing and clamping means moving one of said molds into engagement with said nozzle to move said nozzle to compress said yielding means a limited distance only to apply a determined engagement pressure between said nozzle and said mold, and means halting movement of said mold with respect to said yielding means upon movement thereof through said limited distance prior to injection of material thereinto, said first mentioned means applying clamping pressure to said mold upon halting thereof, and means for ejecting material through said nozzle into said mold without further compression of said yielding means.

9. In a plastic injection molding machine, a pair of separable molds, fixed stop means for said molds, means for closing said molds and for moving the same a limited distance against said fixed stop, said means thence applying clamping pressure thereon, an injector with an injection nozzle, means for yieldingly supporting said injection nozzle, said mold closing and clamping means moving one of said molds into engagement with said nozzle before striking said stop means to move said nozzle to compress said yielding means which thereby applies a determined engagement pressure between said nozzle and said mold.

10. In a plastic injection molding machine, a pair of separable molds, means for moving one mold into engagement with the other mold and applying clamping pressure thereon, an injector with an injection nozzle, means for yieldingly supporting said injection nozzle, said mold closing and clamping means moving one of said molds into engagement with said nozzle to move said nozzle to compress said yielding means a limited distance only to apply a determined engagement pressure between said nozzle and said mold, means halting movement of said mold with respect to said yielding means upon movement thereof through said limited distance prior to injection of material thereinto, said first mentioned means applying clamping pressure to said mold upon halting thereof, and means for ejecting material through said nozzle into said mold without further compression of said yielding means, and a motor for separating said nozzle and the adjacent mold a distance greater than said limited distance.

IRA B. LAWYER.